Patented Dec. 28, 1926.

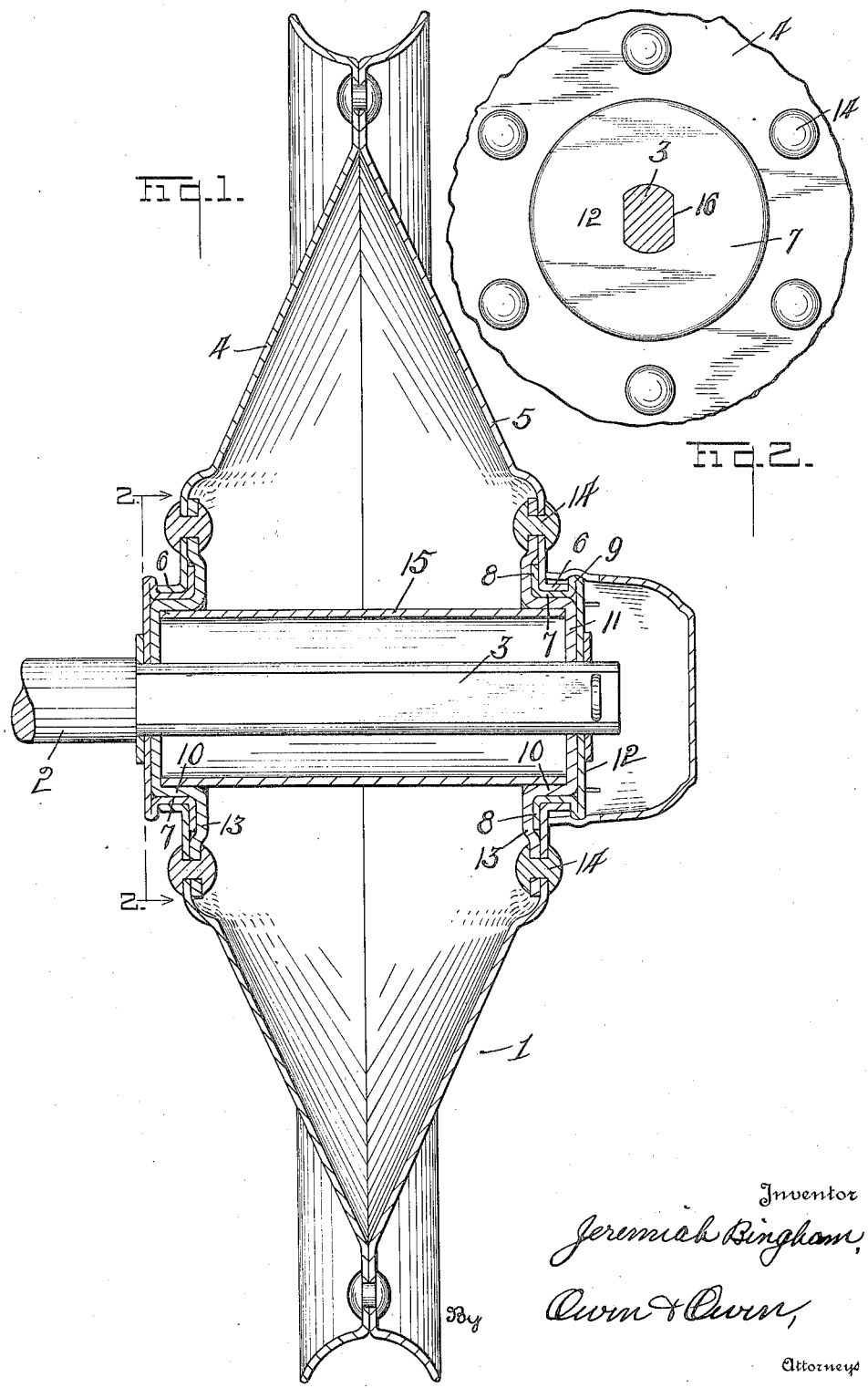

1,612,172

UNITED STATES PATENT OFFICE.

JEREMIAH BINGHAM, OF TOLEDO, OHIO, ASSIGNOR TO THE BINGHAM STAMPING & TOOL COMPANY, OF TOLEDO, OHIO, A CORPORATION OF OHIO.

WHEEL-HUB CONSTRUCTION.

Application filed November 27, 1925. Serial No. 71,680.

This invention relates particularly to disc wheels of the axle driven type as distinguished from those of the loose or free turning type, and has for its object the provision of a strong and durable hub construction for wheels of this class.

The invention is fully described in the following specification, and while in its broader aspect it is capable of embodiment in numerous forms, a preferred embodiment thereof in connection with a sheet metal wheel of the disc type is illustrated in the accompanying drawings, in which—

Figure 1 is a central sectional view of the wheel with the section taken longitudinally through the wheel axis and with an axle in driving connection therewith, and Fig. 2 is a setcion taken on the line 2—2 in Fig. 1 with the outer portion of the wheel broken away.

Referring to the drawings, 1 designates a wheel of the disc type embodying the invention and 2 an axle or shaft which has its wheel carrying end or spindle portion 3 other than circular in cross-section and fitting into corresponding openings in the hub ends of the wheel to cause a rotation of one to drive the other. In the present instance, the axle end has two sides flattened.

The wheel 1 has the opposing discs 4 and 5 each provided at its center with an opening with the metal immediately surrounding the opening turned outward to form a cylindrical flange 6, which is spaced a distance from the axle spindle. A cup-shaped member 7 has its cylindrical portion fitted within the flange 6 and has portions outwardly flanged at opposite ends of the flange 6 and in engagement therewith to prevent relative axial movements of the parts. In the present instance, the free end of the member 7 is turned outwardly to form a flange 8 that bears outwardly against the inner marginal edge portion of the respective wheel disc, and the portion of the cup member at the outer end of the flange 6 is formed with a radial loop or flange 9 for engagement with the flange 6.

A second cup member 10, which in the present instance is shown as being of heavier stock than the metal forming the cup member 7, is fitted into the cylindrical portion of the cup member 7 from the inner side of the associated wheel disc and with its closed end portion 11 bearing flat against the closed portion 12 of the member 7. The free end of the cylindrical portion of the member 10 is turned outwardly to form a radial flange 13, which closely embraces and extends beyond the outer edge of the flange 8 and bears at its free edge portion against the side of the associated disc 5 to which it is secured by a series of rivets 14. The portion of each of the wheel discs which is overlapped by the associated reinforcing flange 13 is radially disposed in the present instance, although this is not necessary. The customary hub sleeve 15 of the wheel has its ends fitted in the cylindrical portions of the respective inner cup members 10 and serves as an axial spacing means for the opposite members 10. Each set of cup members 10 has an axle receiving opening 16 provided centrally through the closed end portions 11 and 12 thereof for receiving the spindle portion 3 of an axle, and these openings correspond in shape to the cross-sectional shape of the spindle or are otherwise suitably shaped with respect to the spindle so that the axle and wheel will be caused to turn together.

It is evident that by constructing the hub portion of the wheel in the manner described, it is rendered very strong and durable and is at the same time comparatively inexpensive as the parts are all preferably stamped from sheet metal and are adapted to be easily and quickly assembled.

I wish it understood that my invention is not limited to any specific construction, arrangement or form of the parts, as it is capable of numerous modifications and changes without departing from the spirit of the claims, and also that while particularly described in connection with a wheel it may be embodied in rollers, pulleys or the like, as desired, and that the term wheel where used is to be construed as applying as well to a roller or pulley.

Having thus described my invention, what I claim as new and desire to secure by Letters Patent is:

1. A hub construction for disk wheels having a central opening therein, comprising a plurality of cup members mounted one within the other in the opening and anchored to the wheel, each having its closed end portion provided with an axle receiving opening, and a hub sleeve mounted in the inner of said cup members in spaced concentric relation to said opening.

2. A hub construction for disk wheels having a central opening therein, comprising a plurality of cup members mounted one within the other, in said opening and anchored to the wheel, each having its closed end portions provided with an axle receiving opening, an axle mounted in the openings of said cup members and having driving engagement therewith, and a hub sleeve mounted in the inner of said cup members in spaced relation to the axle.

3. A hub construction for disk wheels having a central opening provided with the edge wall thereof outwardly flanged, comprising two cup shaped members mounted one within the other in said opening, the outer member engaging the flange to prevent relative longitudinal movements thereof, and a radially extending flange on the inner member, said radially extending flange projecting outwardly around the inner end of the outer member and being fixed to the wheel, said members having registering centrally disposed openings in their closed end portions for an axle.

4. A disc wheel having opposed discs with the central portions thereof axially spaced and provided with central axially aligned openings, a pair of cup-shaped members mounted one within the other in each disc opening with their closed ends disposed outwardly and provided with registering axle receiving openings, said members being secured against movements relative to each other and to the discs, and a hub sleeve fitted at its ends within the respective inner cup member of the respective pair.

5. A disc wheel having the central portions of its opposed discs spaced apart and each provided with a central opening with the edge wall thereof outwardly flanged, a cup member fitted in the opening flange of each disc and having its closed end disposed outwardly, said member having radially projecting portions in engagement with opposite ends of the flange to retain the parts in rigid assembled relation, a second cylindrical cup member fitted within the first member with its closed end abutting the closed end of the first member and with the free edge of its cylindrical portion flanged outwardly around and beyond the inner end of the first member, means for rigidly securing the flange of the second member to the associated disc, said members having their closed portions provided with aligned axle receiving openings, a hub sleeve fitted at each end within the associated second cup member and an axle having a spindle portion other than circular in cross-section projected through the openings of said members and co-acting with the members to effect a turning of the same with the axle.

In testimony whereof I have hereunto signed my name to this specification.

JEREMIAH BINGHAM.